(12) United States Patent
Cymerman et al.

(10) Patent No.: US 7,763,166 B2
(45) Date of Patent: Jul. 27, 2010

(54) RELOCATABLE COUNTERCURRENT DECANTATION SYSTEM

(75) Inventors: George J. Cymerman, Edmonton (CA); Jessica Vandenberghe, Edmonton (CA)

(73) Assignees: Canadian Oil Sands Limited, Calgary (CA); Canadian Oil Sands Limited Partnership, Calgary (CA); Conocophilllips Oilsands Partnership II, Calgary (CA); Imperial Oil Resources, Calgary (CA); Mocal Energy Limited, Tokyo (JP); Nexen Oil Sands Partnership, Calgary (CA); Murphy Oil Company Ltd., Calgary (CA)

( * ) Notice: Subject to any disclaimer, the term of this patent is extended or adjusted under 35 U.S.C. 154(b) by 694 days.

(21) Appl. No.: 11/424,684

(22) Filed: Jun. 16, 2006

(65) Prior Publication Data

US 2007/0289911 A1    Dec. 20, 2007

(51) Int. Cl.
*C10G 1/04*    (2006.01)
*B01D 21/02*   (2006.01)
*B01D 21/28*   (2006.01)

(52) U.S. Cl. ................. 208/391; 208/390; 208/424; 210/512.1; 210/513

(58) Field of Classification Search ............ 208/391, 208/424, 425, 390; 210/512.1, 513
See application file for complete search history.

(56) References Cited

U.S. PATENT DOCUMENTS

| 4,437,998 | A | * | 3/1984 | Yong ........................ 210/728 |
| 4,859,317 | A | | 8/1989 | Shelfantook et al. |
| 5,264,118 | A | * | 11/1993 | Cymerman et al. ......... 208/390 |
| 6,899,231 | B2 | | 5/2005 | Larsson |
| 2005/0150844 | A1 | * | 7/2005 | Hyndman et al. ........... 210/750 |

FOREIGN PATENT DOCUMENTS

| CA | 1267860 |   | 4/1990 |
| CA | 1293465 |   | 12/1991 |
| CA | 2332207 | * | 2/2002 |
| CA | 2453697 |   | 6/2005 |
| CA | 2493677 |   | 6/2005 |

* cited by examiner

*Primary Examiner*—Walter D Griffin
*Assistant Examiner*—Renee Robinson
(74) *Attorney, Agent, or Firm*—Bennett Jones LLP

(57) ABSTRACT

A process line for separating oil sand slurry comprising coarse solids, fines, bitumen and water, into a first product comprising bitumen, fines and water and a second product comprising coarse solids, fines and water is provided comprising a plurality of countercurrently operating solid/liquid separators arranged in series along a pipeline, wherein the underflow of one separator is fed to the next separator in series and the overflow of each separator is fed to the preceding separator, the underflow of the last separator being the second product and the overflow from the first separator being the first product.

22 Claims, 7 Drawing Sheets

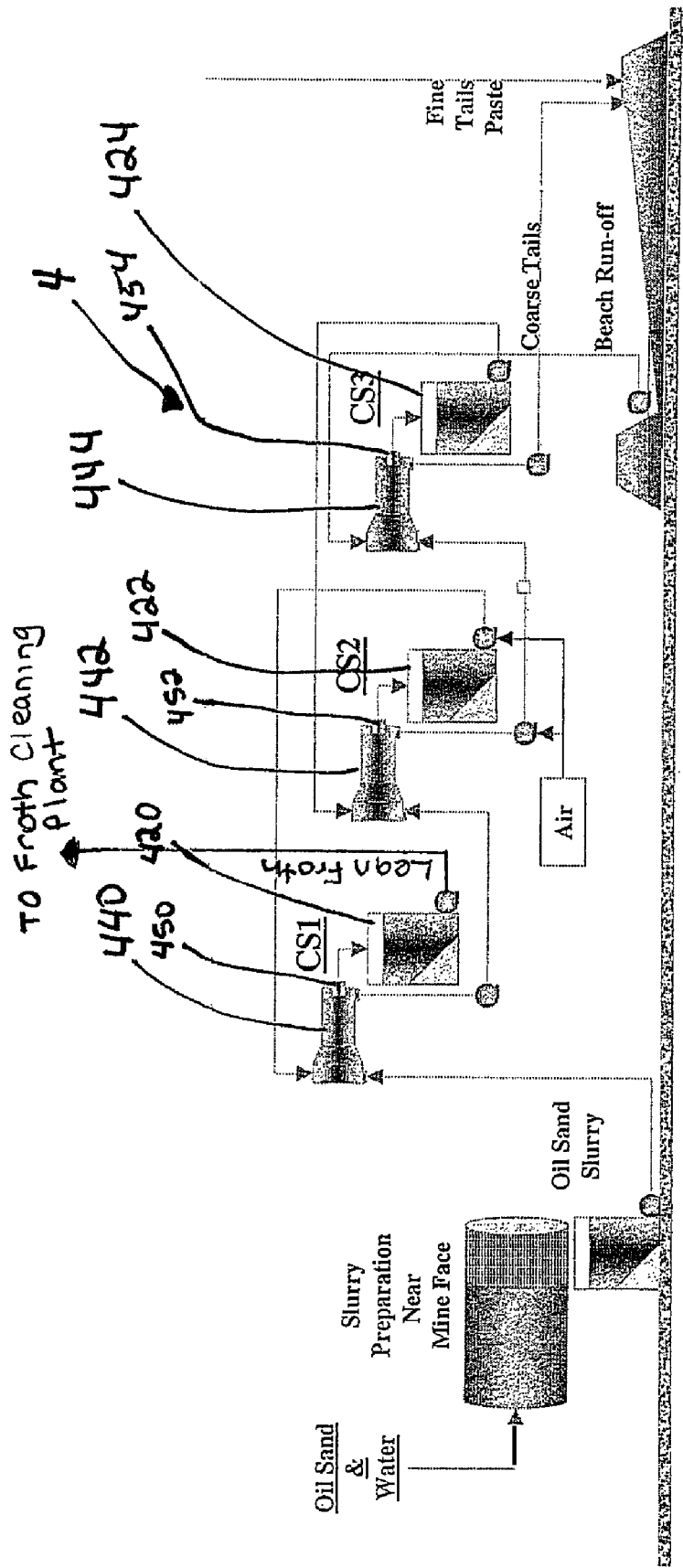

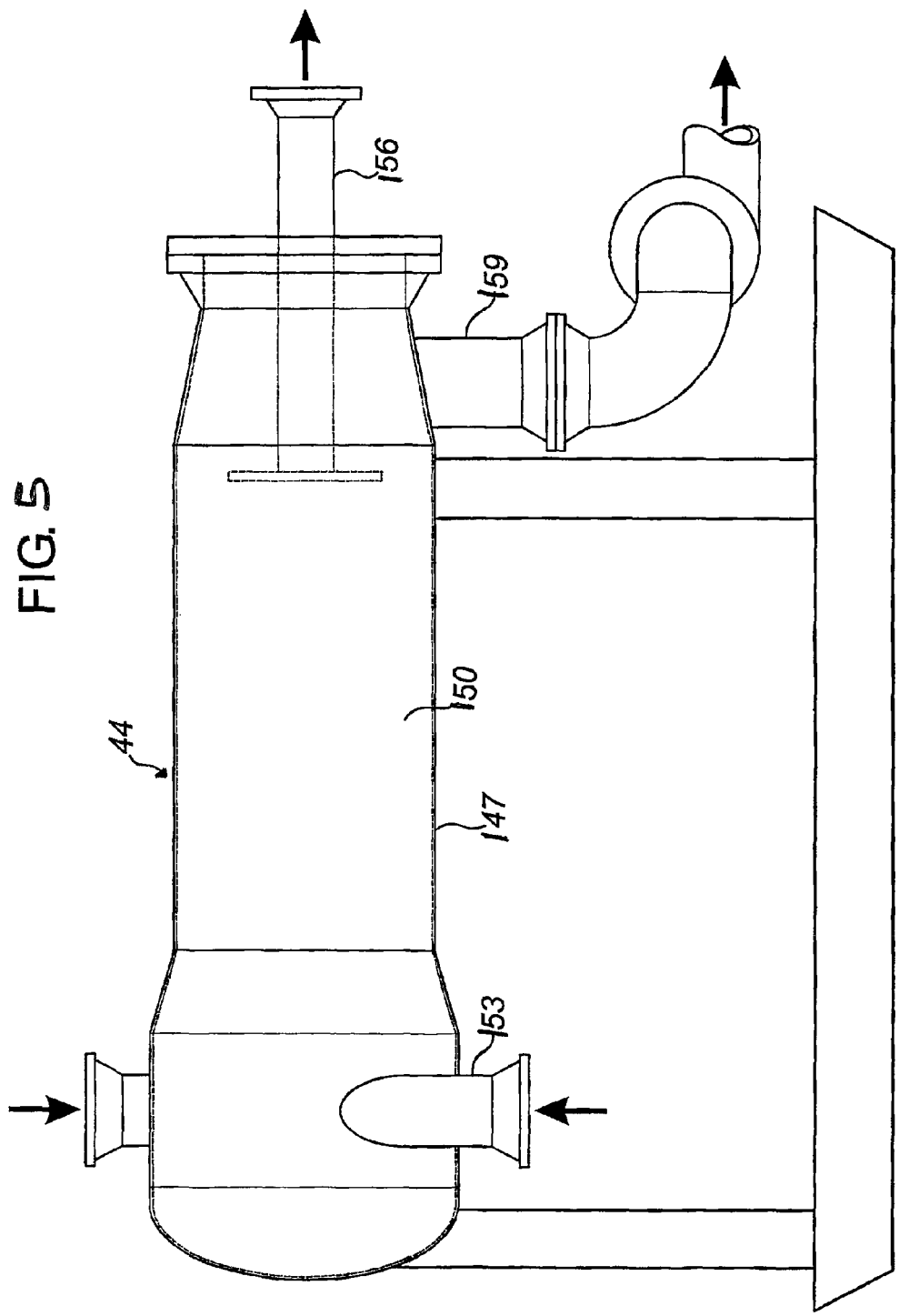

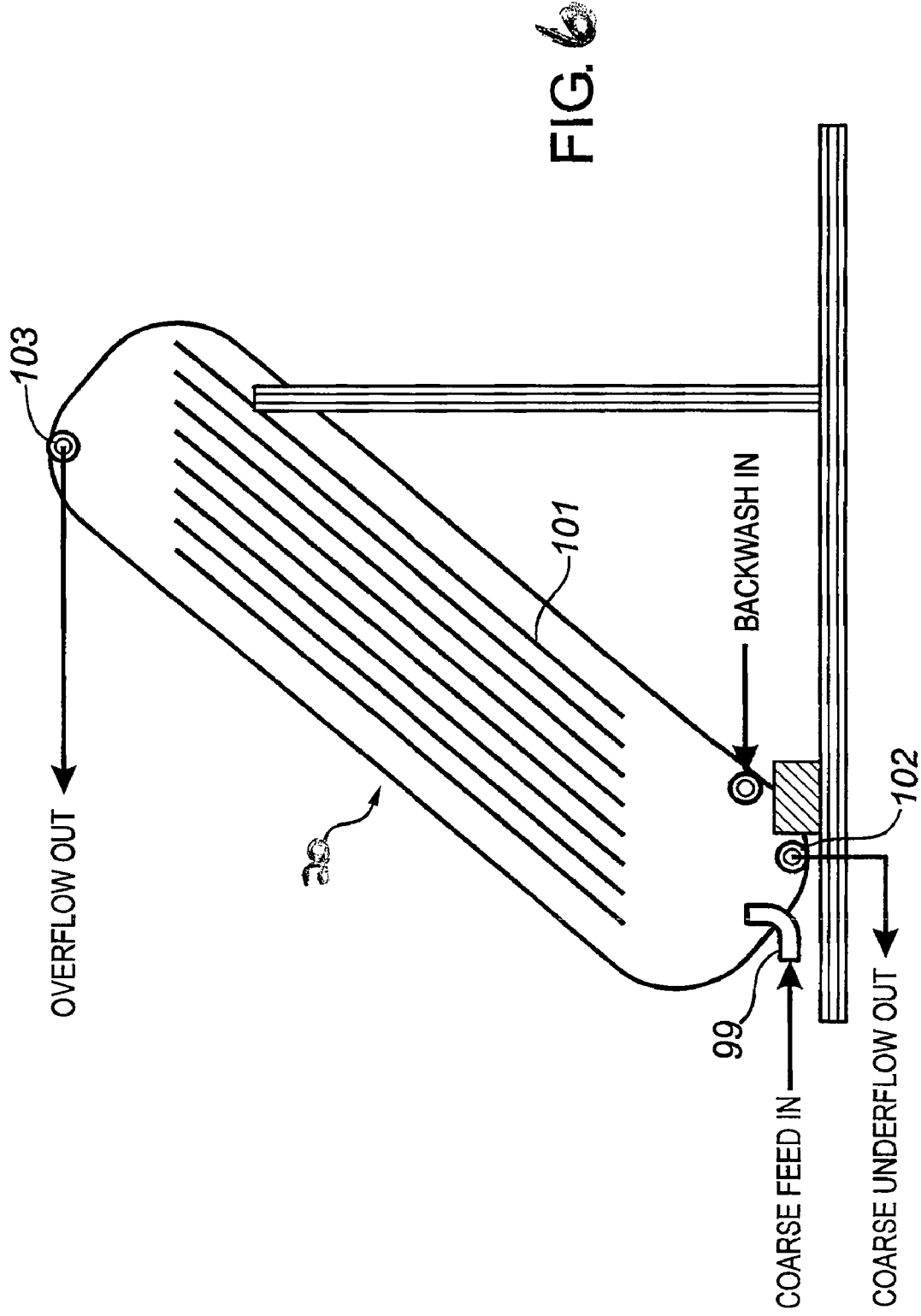

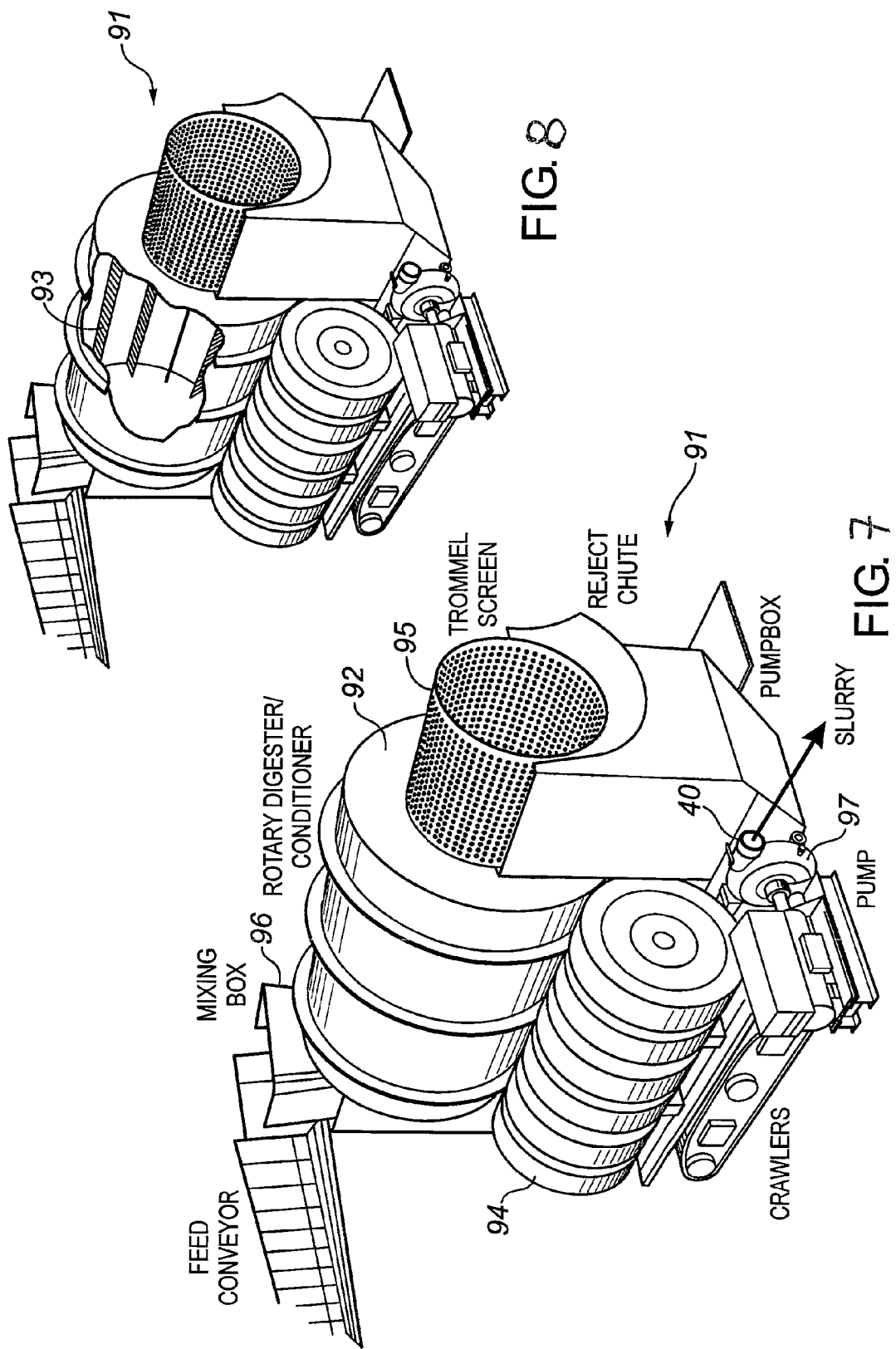

RELOCATABLE COUNTERCURRENT DECANTATION SYSTEM

The present invention relates generally to a process and a circuit for producing a first product comprising bitumen, fines and water and a second product comprising coarse solids, fines and water, from oil sand. More particularly, the present invention relates to a process and a circuit comprising a countercurrent decantation assembly having a plurality of sand/liquid separators that may be mobile or relocatable.

BACKGROUND OF THE INVENTION

Oil sand, such as is mined in the Fort McMurray region of Alberta, generally comprises water-wet sand grains held together by a continuous matrix of viscous bitumen. It lends itself to liberation of the sand grains from the bitumen, preferably by slurrying the oil sand in hot process water, allowing the bitumen to move to the aqueous phase. Oil sand slurrying generally takes place in large, stationary slurry preparation or mixing towers. Once oil sand slurry is formed, the slurry is pumped through a pipeline at least 2.3 km long to the bitumen extraction facility.

During pipelining of oil sand slurry to extraction facility, the oil sand slurry undergoes conditioning, namely, ablation of oil sand lumps, liberation of bitumen from the oil sand, entrainment of the bitumen by air bubbles, and the coalescence of bitumen droplets. This allows the bitumen to be separated out more readily. The conditioned slurry is then temporarily retained under quiescent conditions in a large gravity separation vessel (referred to as the "PSV") housed at the bitumen extraction facilities, where the sand settles and is removed as an underflow, together with some bitumen and water, and the aerated bitumen, contaminated with water and solids, including fines, rises and is recovered as froth.

These deep cone PSVs are very large, approximately 30 meters in diameter, so as to provide the large separation area required to process 8000 tonne per hour oil sand. The PSV is also 35 meters tall to assure free flow of coarse solids to the centrally located bottom discharge. When filled with oil sand slurry, each PSV weighs up to 25,000 tonnes and is suspended on 12 friction piles extending ~40 meters below grade.

Bitumen extraction facilities housing these large PSVs have traditionally been located removed from the actively mined mine sites. Further, as the actively mined mine sites become more remote as the mine faces recede, the distance that the oil sand slurry must travel from the mine face to extraction and the distance that the separated sand must travel to sand disposal sites frequently exceeds 10 km. It is expensive to transport massive quantities of sand over long distances by pipeline, considering the high energy requirement per ton/km, the high cost of maintenance due to abrasion, as well as the capital cost of pipelines, pumps and auxiliary equipment.

The present invention uses a countercurrently operating assembly comprising a plurality of sand/liquid separators, which assembly is preferably relocatable, to separate out sand from bitumen, which may be configured so as to minimize the distance of sand transportation. Further, the present invention recycles water from tailings deposits thereby conserving water and reducing the need for heated water.

The present invention provides at least one of the following benefits:

1. reduced cost of sand transportation;
2. increased bitumen recovery from oil sand; and
3. reduced heat energy requirement, due to the displacement of warm middlings in the tailings stream with cold "beach run-off", i.e., water from tailings deposition ponds.

SUMMARY OF THE INVENTION

In accordance with one broad aspect of the invention, there is provided a process line for separating oil sand slurry comprising coarse solids, fine solids (fines), bitumen and water into a first product comprising bitumen, fines and water and a second product comprising coarse solids, fines and water, said process line having:
  a pipeline for transporting and conditioning oil sand slurry;
  a plurality of countercurrently operating solid/liquid separators arranged in series along the pipeline, each separator operatively connected to the pipeline and to each other, and each separator producing an underflow and an overflow, wherein the underflow of one separator is fed to the next separator in series and the overflow of each separator is fed to the preceding separator, the underflow of the last separator being the second product and the overflow from the first separator being the first product; and
  a tailings deposition pond for receiving the second product, whereby, when the coarse solids settle out from the water in the tailings deposition pond, the water is recycled back to the last separator.

In one embodiment the process line further has a bitumen cleaning means operative to receive the first product and remove a portion of the fines and water therefrom to produce clean bitumen froth. In one embodiment, the bitumen cleaning means comprises a gravity separation vessel such as a primary separation vessel (PSV), wherein the bitumen floats to the top of the vessel to form clean bitumen froth and the fines settle to the bottom of the vessel. In another embodiment, the bitumen cleaning means comprises an inclined plate settler and a flotation cell in series, each producing an overflow and an underflow and operatively interconnected so that the flotation cell receives the underflow from the inclined plate settler and the overflow from the flotation cell is recycled back to the inclined plate settler, the overflow from the inclined plate settler being the clean bitumen froth.

In accordance with another broad aspect of the invention, there is provided a process line for separating oil sand slurry comprising coarse solids, fine solids (fines), bitumen and water into a first product comprising bitumen, fines and water and a second product comprising coarse solids, fines and water, said process line having:
  a pipeline for transporting and conditioning oil sand slurry; and
  a plurality of countercurrently operating solid/liquid separators arranged in series along the pipeline, each separator operatively connected to the pipeline and to each other, and each separator producing an underflow and an overflow;

wherein the underflow of one separator is fed through the pipeline for further conditioning to the next separator in series and the overflow of each separator is fed to the preceding separator, the underflow of the last separator being the second product and the overflow from the first separator being the first product.

In accordance with another broad aspect of the invention, there is provided a circuit for producing a first product comprising bitumen, fines and water and a second product comprising coarse solids, fines and water, from mined oil sand, said circuit having:

a slurry preparation unit for mixing mined oil sand with hot water to produce an oil sand slurry comprising coarse solids, fines, bitumen and water;

a pipeline operatively connected with the slurry preparation unit for receiving the oil sand slurry and transporting it while simultaneously conditioning it;

a countercurrently operating assembly comprising a plurality of solid/liquid separators in series, each separator forming a lighter overflow and a heavier underflow, operatively connected to the pipeline for separating most of the coarse solids from the bitumen, wherein the overflow from the first separator in the series is the first product and the underflow from the last separator in the series is the second product; and a tailings deposition pond for receiving the second product, whereby, when the coarse solids settle out from the water in the tailings deposition pond, the water is recycled back to the last separator in the series.

In one embodiment, the circuit is located at the mine site. The phrase "mine site" refers to an area of land presently undergoing open pit mining to excavate oil sand (mine pit) and which has one or more mine faces and one or more tailings retention facilities or tailings deposition ponds, which may be dike-enclosed areas or mined-out pits. In another embodiment, the circuit is located at the mine face. In a further embodiment, the slurry preparation unit and the solid/liquid separators are of a transportable size and relocatable using skids or the like, so that the slurry preparation unit, pipeline and solid/liquid separators are all capable of moving closer to the mine face as the mine face recedes.

In one embodiment, the countercurrently operating assembly comprises at least two separators in series, the separators being selected from a group consisting of gravity settlers, inclined plate settlers, cycloseparators, hydrocyclones, or combinations thereof. In another embodiment, the countercurrently operating assembly comprises at least three separators in series, the separators being selected from the group consisting of gravity settlers, inclined plate settlers, cycloseparators, hydrocyclones, or combinations thereof.

In accordance with another broad aspect of the invention, there is provided a process for separating oil sand slurry comprising coarse solids, fines, bitumen and water, into a first product comprising bitumen, fines and water and a second product comprising coarse solids, fines and water, having the steps of:

providing in series at least two solid/liquid separators, each separator having an inlet, an overflow outlet and an underflow outlet and each separator producing a lighter overflow stream and a heavier underflow stream;

feeding oil sand slurry to the inlet of the first separator in the series and removing the overflow stream through the overflow outlet of the first separator to produce the first product;

removing the underflow stream of the first separator through its underflow outlet and feeding it to the inlet of the next separator in the series;

recycling the overflow of said next separator and each subsequent separator to the inlet of the preceding separator and feeding the underflow of said next separator and each subsequent separator to the inlet of the following separator;

removing the underflow of the last separator to produce the second product and depositing the second product into a tailings deposition pond; and allowing the solids to separate from the water and recycling the water from the tailings deposition ponds back to the inlet of the last separator in the series.

In one embodiment, the process further has the step of removing most of the fines in the first product by gravity separation to produce cleaned bitumen froth. In one embodiment, fines are removed from the first product using a gravity separation vessel such as a primary separation vessel (PSV). In another embodiment, fines are removed using in series an inclined plate settler and a flotation cell.

BRIEF DESCRIPTION OF THE DRAWINGS

FIG. 4 is a schematic showing another embodiment of a circuit for producing a first product comprising bitumen, fines and water and a second product comprising coarse solids, fines and water, from mined oil sand.

FIG. 5 is a side view of a cycloseparator, which may be used in the process line and circuit of the present invention, showing the internal section of the vortex finder in dotted lines.

FIG. 6 is a sectional side view showing and inclined plate settler.

FIG. 7 is a perspective view of a rotary digester, which may be used in the circuit to form oil sand slurry.

FIG. 8 is a view similar to FIG. 7, showing part of the drum wall broken away to display internal lifters.

DESCRIPTION OF THE PREFERRED EMBODIMENTS

The invention is exemplified by the following embodiments.

Figure 1:
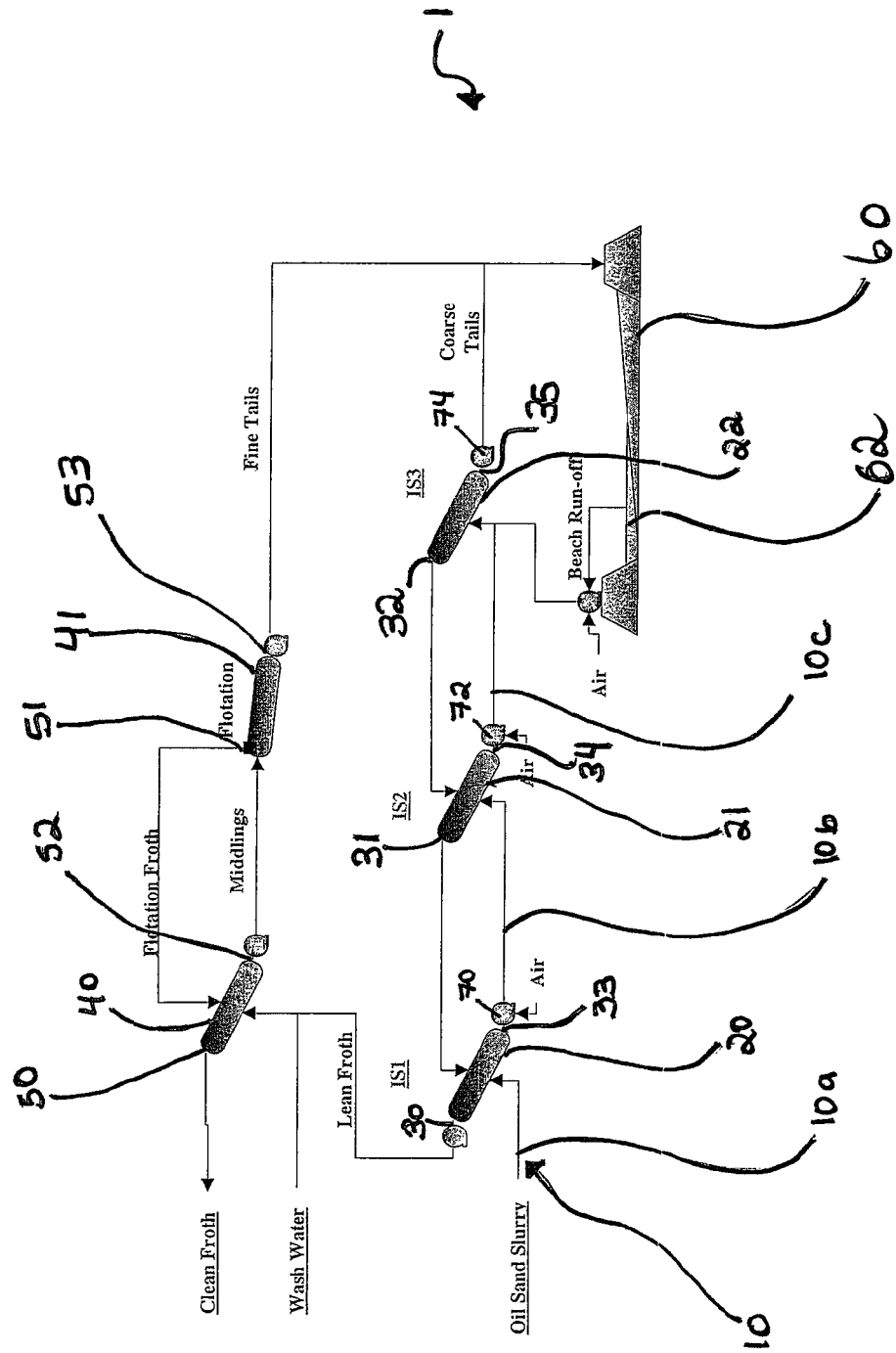
FIG. 1 is a schematic showing one embodiment of a process line for separating oil sand slurry into a first product comprising bitumen, fines and water and a second product comprising coarse solids, fines and water.

With reference first to FIG. 1, process line 1 comprises a series of countercurrently operating separators. More particularly, the separators used are inclined plate settlers 20, 21, 22, one of which is shown in more detail in FIG. 6. Process line 1 further comprises pipeline 10, which pipeline is divided into three pieces 10a, 10b and 10c. Pipeline 10b interconnects first inclined plate settler 20 to second inclined plate settler 21 and pipeline 10c interconnects second inclined plate settler 22 to third inclined plate settler 23.

Pipeline 10a feeds oil sand slurry to inclined plate settler 20, the first settler in the series. Overflow 30 is produced, which is referred to herein as the first product, which first product comprises bitumen, fines and water and is often referred to as lean froth. If desired, much of the fines and water in overflow 30 can be removed by delivering it to inclined plate settler 40 to produce an overflow 50 of clean bitumen froth and an underflow 52, also referred to in the industry as middlings. Underflow 52 is then delivered to a flotation cell 41 where most of the bitumen still remaining will float and be removed as overflow 51, or flotation froth. Overflow 51 is recycled back to inclined plate separator 40 to ensure that virtually all of the bitumen is recovered as a clean froth product. Underflow 53 can be disposed of either in tailings deposit 60 or further processed into thickened fine tails or paste, using a fine tails thickener (not shown).

Underflow 33 from inclined plate settler 20 is optionally aerated and pumped via pump 70 through pipeline 10b to second inclined separator 21. Further conditioning of the underflow oil sand slurry occurs in pipeline 10b and thus additional bitumen is released, aerated and coalesced. Overflow 31 from second inclined separator 21 is recycled back to first inclined separator 20 and underflow 34 is again optionally aerated and pumped via pump 72 through pipeline 10c for further conditioning to a third inclined plate settler 22. Overflow 32 from the third inclined plate settler 22 is recycled back to the second inclined plate settler 21 and underflow 35, the second product, which comprises washed coarse sand, fines and water, is pumped via pump 74 and deposited into tailings deposit 60. Water 62, also referred to as beach run-off, can be recycled back to the third inclined plate settler 22, thereby conserving water and reducing heat losses, as described in more detail below.

Separation of solids from bitumen and water can be understood more clearly with reference to FIG. 6, showing first inclined plate settler 20 as an example. The oil sand slurry (or underflow) is fed into the bottom inlet 99 of inclined plate separator 20 from pipeline 10 (not shown). As the inclined plate settler 20 fills with slurry, the coarse solids or sand start to separate out due to gravity and the coarse solids drop along the internal plates 101 to the bottom of the settler. Coarse solids are then withdrawn through the outlet 102 as underflow. The bitumen, fines and water, leave through the top outlet 103 as overflow.

Figure 2:
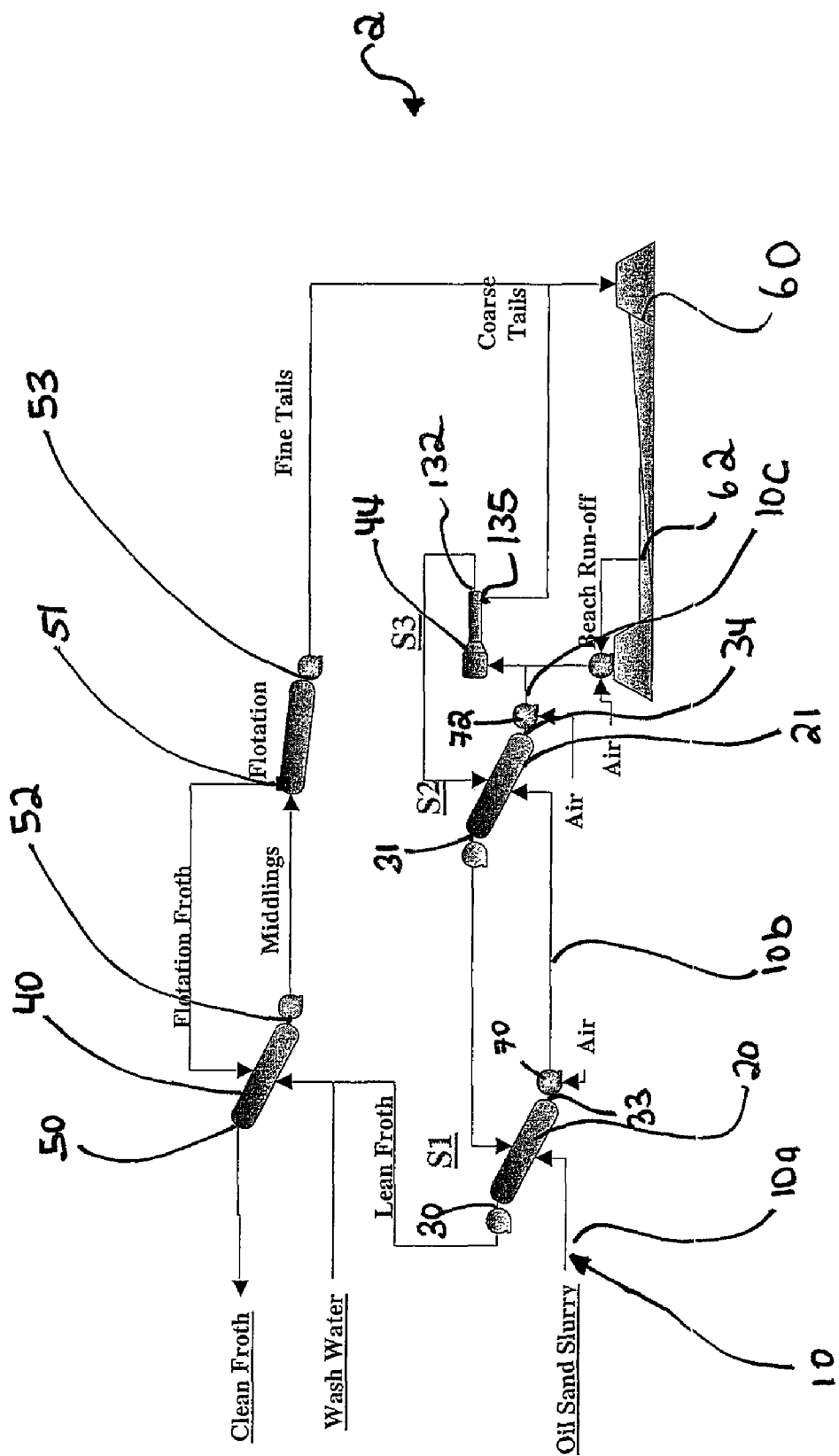
FIG. 2 is a schematic showing another embodiment of a process line for separating oil sand slurry into a first product comprising bitumen, fines and water and a second product comprising coarse solids, fines and water.

FIG. 2 is a schematic of another embodiment of a process line of the present invention. Process line 2 comprises, in series, countercurrently operating separators, more particularly, two inclined plate settlers 20, 21, and a centrifugal cycloseparator 44, which cycloseparator is shown in more detail in FIG. 5. With reference now to FIG. 5, cycloseparator 44 is generally a cylindrical, hollow vessel 147 having an internal chamber 150, tangential inlet 153 at the upstream end, and central vortex finder outlet 156 (for overflow) and peripheral outlet 159 (for underflow) at the downstream end.

With reference again to FIG. 2, underflow 34 from the second inclined plate settler 21 is optionally aerated and pumped via pump 72 to the inlet of cycloseparator 44. Underflow 34 spins as it advances longitudinally through the cycloseparator's vessel chamber. The heavier fraction concentrates outwardly and leaves the vessel chamber as an underflow stream 135 (second product comprising mainly sands, fines and water) through the peripheral outlet. Underflow stream 135 is then deposited into tailings deposit 62. The lighter fraction (comprising mainly water and fines and some residual bitumen) concentrates inwardly and leaves as overflow 132 through the vortex finder outlet and is recycled back to the second inclined plate settler 21.

Figure 3:
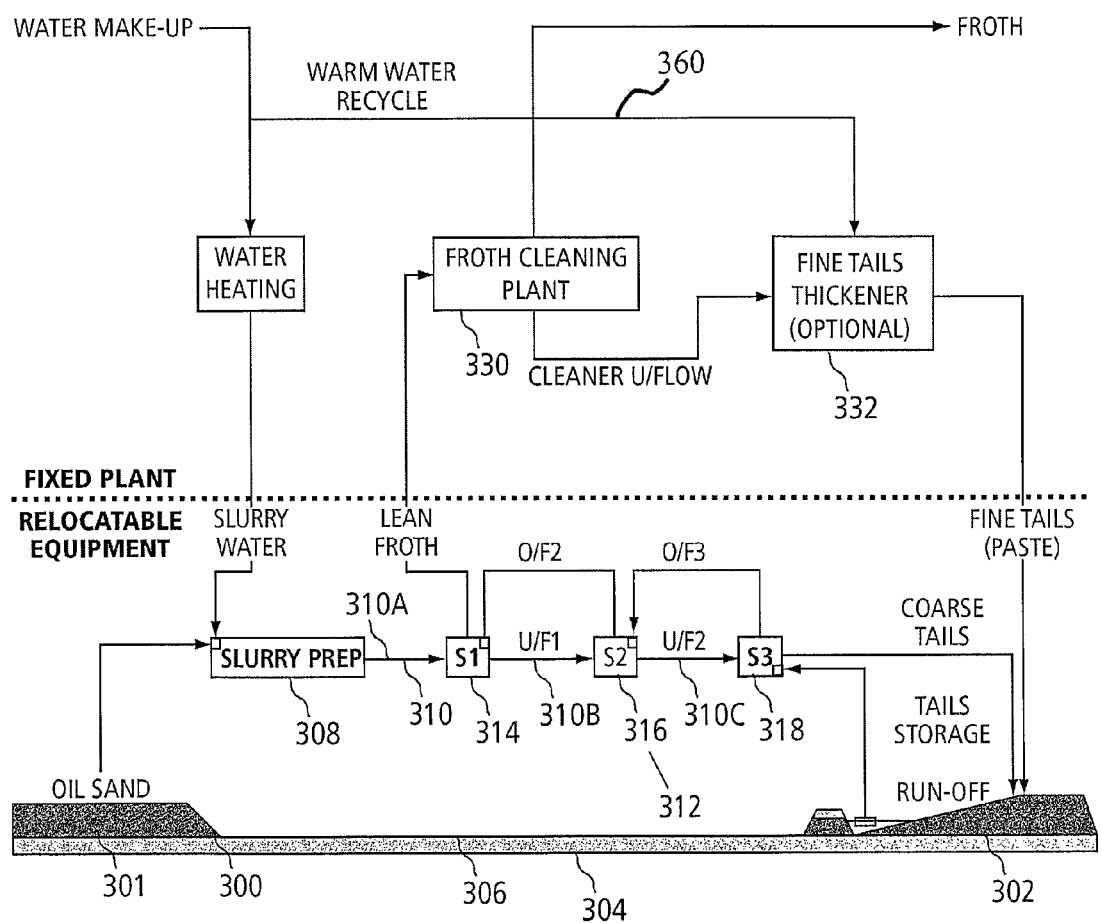
FIG. 3 is a schematic showing one embodiment of a circuit for producing a first product comprising bitumen, fines and water and a second product comprising coarse solids, fines and water, from mined oil sand.

FIG. 3 presents a conceptual flow-diagram of a circuit for producing a first product comprising bitumen, fines and water and a second product comprising coarse solids, fines and water, from mined oil sand, using relocatable equipment located at the mine site 304. Mine site 304 comprises mine pit 306, mine face 300 and tailings deposit 302. The circuit involves strip mining oil sand 301 at one side of the mine site 304 and producing an oil sand slurry with hot water in a relocatable slurry preparation unit 308, located close to mining face.

A relocatable slurry preparation unit useful in the present invention is a rotary digester shown in more detail in FIG. 7 and FIG. 8. Rotary digester 91 is a rotatable drum having internal lifters 93, drive means 94 and a trommel screen 95. The oil sand and water are fed into a feed box 96 and are tumbled within the drum 92 to mix them and condition the produced slurry. The screen 95 removes oversize and the screened slurry is pumped through a pipeline by pump 97.

Referring again to FIG. 3, the oil sand slurry prepared in slurry preparation unit 308 is pumped through pipeline 310, which comprises pipeline pieces 310a, 310b, 310c, which pipeline 310 is within the mined-out-pit and configured along the shortest practical route, to a sand storage site or tailings deposition pond 302. It is understood that for a few initial years, tailings must be deposited outside the mined-out pit. However, as soon as the mined out pit becomes large enough, tailings are stored in the pit.

Considering the scale of mining and tailings storage operations, the slurry pipeline will extend several kilometers. The countercurrently operating assembly 312 comprises three separators 314, 316, 318, which separators can be gravity settlers, inclined plate settlers, cycloseparators, hydrocyclones or combinations thereof. The first separator 314 is preferably situated at least 2.0 to 2.5 km away from the slurry preparation unit 308 to maximize the benefits of pipeline conditioning and thus pipeline 310a is preferably at least 2.0 km. However, the circuit provides an opportunity for further conditioning and bitumen recovery in pipelines 310b and 310c. To take best advantage of the additional pipeline conditioning, the last separator 318 should be located close to the tailings deposition pond 302. As mining faces and tailings deposition ponds advance, the last separator 318 is relocated to the front end of the countercurrently operating assembly and the pipeline is rearranged accordingly.

In operation, using as an example a countercurrently operating assembly comprising three separators as shown in FIG. 3, wherein each separator produces an underflow stream and an overflow stream, pipeline conditioned slurry is mixed with the overflow stream of the second separator 316 and introduced into the first separator 314, where coarse solids, rocks, undigested lumps and bitumen/sand aggregates are concentrated to form first stage underflow, along with some middlings and un-aerated bitumen. A first stage underflow pump (not shown) transfers the first stage underflow stream to the second separator 316 and controls its rate. The rate of the first stage overflow is the difference between the feed and the underflow rates and it comprises the excess middlings, finer solid fractions, most liberated/aerated bitumen, as well as some un-aerated, small bitumen droplets that normally follow middlings.

The first stage underflow is mixed with the third stage overflow of the third separator 318 and fed into the second separator 316, where settling coarse solids and other large objects, along with some middlings and bitumen, are withdrawn as second stage underflow and passed to the third separator 318. The middlings and bitumen overflow of the second separator 316 is then passed to the first separator 314.

The second stage underflow stream from the second separator 316 is then mixed with water from the tailings deposition pond 302, which water is also referred to as cold beach run-off, and passed to third separator 318. The third stage underflow from third separator 318 is then pipelined to tailings deposition pond 302, where coarse sand settles and excess liquid run-off pools at the foot of the tailings pile. Run-off is held in a small pool equipped with a floating run-off pumping barge. It is important to limit the size of the pool as to avoid the formation of large volumes of Mature Fine Tails.

All fines and bitumen that failed to be captured in the settled coarse sand within a few days of storage are collected with the run-off and mixed with the second stage underflow to feed the third separator 318. Hence, the second stage underflow is diluted with cold run-off, resulting in the bitumen content and temperature being reduced. However, the third stage overflow becomes enriched in bitumen and warmed up by comparison with the beach run-off. This process of dilution of warmer/bitumen-richer middlings from a previous stage with colder/bitumen-leaner overflow from a subsequent stage enables very high recoveries of heat and bitumen, which is controlled mostly by the efficiency of liquid/solid separation in the separators and volumetric ratio of run-off to middlings content in underflow streams.

By way of example, assuming modest bitumen recoveries of 70% at each stage, the overall bitumen recovery would exceed 97%, with all recovered bitumen and most heat concentrated in the first stage overflow stream, which passes to further processing. This ability to achieve high overall bitumen recovery despite modest individual stage recoveries, allows the use of much smaller and less efficient separators, which may include hydrocyclones, cycloseparators or gravity settlers.

The first stage overflow or first product, which is also referred to as lean froth, may be further upgraded at froth cleaning plant 330. Here, most of the fines and excess water are separated from the bitumen to form clean bitumen froth. The fines may optionally be thickened in fine tails thickener 332 prior to being deposited into tailings deposition pond 302. As previously mentioned, froth cleaning units such as PSVs, inclined plate settlers, flotation cells or combinations there of may be used to produce clean bitumen froth.

As shown in FIG. 3, warm water from the fine tailings thickener 332 can be recycled to the water heating unit 360 for reuse in oil sand slurry preparation.

FIG. 4 is a schematic of another embodiment of a process line of the present invention. Process line 4 comprises, in series, countercurrently operating separators, more particularly, three centrifugal cycloseparators 440, 442 and 444. In this embodiment, overflow from each cycloseparator 440, 442 and 444 leaves through vortex finder outlets 450, 452 and 454, respectively, and is collected in pump boxes 420, 422, and 424, respectively. Overflow in pump box 422 is pumped back to a tangential inlet of cycloseparator 440 and overflow in pump box 424 is pumped back to a tangential inlet of cycloseparator 442. Overflow from the first cycloseparator is collected in pump box 420 as first product (lean froth) comprising bitumen, fines and water, which is then pipelined to a froth cleaning plant (not shown).

We claim:

1. A process line for separating oil sand slurry comprising coarse solids, fines, bitumen and water, into a first product comprising bitumen, fines and water and a second product comprising coarse solids, fines and water, comprising:
    (a) a pipeline for transporting and conditioning oil sand slurry;
    (b) a plurality of countercurrently operating solid/liquid separators arranged in series along the pipeline, each separator operatively connected to the pipeline and to each other, and each separator producing an underflow and an overflow, wherein the underflow of one separator is fed to the next separator in series and the overflow of each separator is fed to the previous separator in series, the underflow of the last separator being the second product and the overflow from the first separator being the first product; and
    (c) a tailings deposition pond for receiving the second product, whereby, when the coarse solids settle out from the water, the water from the tailings deposition pond is recycled back to the last separator.

2. The process line as claimed in claim 1, further comprising a bitumen froth cleaning plant operative to receive the first product and remove a portion of the fines and excess water therefrom to produce cleaned bitumen froth.

3. The process line as claimed in claim 2, wherein the bitumen froth cleaning plant comprises a gravity separation vessel, wherein the bitumen floats to the top of the vessel to form cleaned bitumen froth and a portion of the fines and water settle to the bottom of the vessel.

4. The process line as claimed in claim 2, wherein the bitumen froth cleaning plant comprises an inclined plate settler and a flotation cell in series, each producing an overflow and an underflow and operatively interconnected so that the flotation cell receives the underflow from the inclined plate settler and the overflow from the flotation cell is recycled back to the inclined plate settler, the overflow from the inclined plate settler being the cleaned bitumen froth.

5. A process line as claimed in claim 2, wherein the fines and water are further processed in a fine tails thickener to produce a fine tails paste for disposal and warm water for reuse in oil sand slurry preparation.

6. A circuit for producing a first product comprising bitumen, fines and water and a second product comprising coarse solids, fines and water, from mined oil sand, said circuit having:
    (a) a slurry preparation unit for mixing mined oil sand with hot water to produce an oil sand slurry comprising coarse solids, fines, bitumen and water;
    (b) a pipeline operatively connected with the slurry preparation unit for receiving the oil sand slurry and transporting it while simultaneously conditioning it;
    (c) a countercurrently operating assembly comprising a plurality of solid/liquid separators in series, each separator forming a lighter overflow stream and a heavier underflow stream, operatively connected to the pipeline for separating most of the coarse solid from the bitumen, wherein the overflow stream from the first separator in the series is the first product and the underflow stream from the last separator in the series is the second product; and
    (d) a tailings deposition pond for receiving the second product, whereby, when the coarse solids settle out from the water in the tailings deposition pond, the water is recycled back to the last separator in the series.

7. The circuit as claimed in claim 6, wherein the slurry preparation unit, the pipeline and the countercurrently operating assembly are all relocatable and can be relocated closer to the mine face as the mine face recedes.

8. The circuit as claimed in claim 6, wherein the slurry preparation unit, the pipeline, the countercurrently operating assembly and the tailings deposition pond are all located at the mine site.

9. The circuit as claimed in claim 6, wherein the slurry preparation unit, the pipeline, the countercurrently operating assembly and the tailings deposition pond are all located at the mine face.

10. The circuit as claimed in claim 6, wherein the separators are selected from a group consisting of gravity settlers, inclined plate settlers, cycloseparators, hydrocyclones, or combinations thereof.

11. The circuit as claimed in claim 6, wherein the countercurrently operating assembly comprises at least two separators in series, the separators being selected from the group consisting of gravity settlers, inclined plate settlers, cycloseparators, hydrocyclones, or combinations thereof.

12. A process for separating oil sand slurry comprising coarse solids, fines, bitumen and water, into a first product comprising bitumen, fines and water and a second product comprising coarse solids, fines and water, comprising:

(a) providing in series at least two solid/liquid separators, each separator having at least one inlet, an overflow outlet and an underflow outlet and each separator producing a lighter overflow stream and a heavier underflow stream;

(b) feeding oil sand slurry to the at least one inlet of the first separator in the series and removing the overflow stream through the overflow outlet of the first separator to produce the first product;

(c) removing the underflow stream of the first separator through the underflow outlet and feeding it to the inlet of the next separator in the series;

(d) recycling the overflow of said next separator and each subsequent separator to the inlet of the preceding separator and feeding the underflow of said next separator and each subsequent separator to the inlet of the following separator;

(e) removing the underflow of the last separator in the series to produce the second product and depositing the second product into a tailings deposition pond; and (f) allowing the solids to separate from the water in the second product and recycling the water from the tailings deposition ponds back to the inlet of the last separator in the series.

13. The process as claimed in claim 12, further comprising:

(g) removing most of the fines and water in the first product by gravity separation to produce cleaned bitumen froth.

14. The process as claimed in claim 13, wherein the fines and water are removed from the first product using a gravity separation vessel, an inclined plate settler, a flotation cell, or any combination thereof.

15. The process as claimed in claim 13, wherein the fines and water are further processed in a fine tails thickener to produce a fine tails paste for disposal.

16. A process line for separating oil sand slurry comprising coarse solids, fines, bitumen and water, into a first product comprising bitumen, fines and water and a second product comprising coarse solids, fines and water, comprising:

(a) a pipeline for transporting and conditioning oil sand slurry; and (b) a plurality of countercurrently operating solid/liquid separators arranged in series, the first separator in the series operatively connected to the pipeline for receiving the conditioned oil sand slurry, each separator operatively connected to the next separator in series such that the underflow of one separator is fed to the next separator in the series and the overflow of each separator is fed to the previous separator in series, the underflow of the last separator being the second product and the underflow from the first separator being the first product;

wherein each separator, except the last separator, is connected to the next separator in the series by a portion of additional piping of sufficient length to provide additional pipeline conditioning of the underflow product of each separator except the last separator.

17. The process line as claimed in claim 16, further comprising:

(c) a tailings deposition pond for receiving the second product, whereby, when the coarse solids settle out from the water, the water from the tailings disposition pond is recycled back to the last separator.

18. A process line for separating oil sand slurry comprising coarse solids, fines, bitumen and water, into a first product comprising bitumen, fines and water and a second product comprising coarse solids, fines and water, comprising:

(a) a pipeline for transporting and conditioning oil sand slurry; and (b) a plurality of countercurrently operating solid/liquid separators arranged in series along the pipeline, the solid/liquid separators comprising inclined plate settlers having at least one internal plate arranged in series, each producing an underflow and an overflow, the first inclined plate settler in the series operatively connected to the pipeline to receive the oil sand slurry and each inclined plate separator in series connected to each other such that the underflow of one inclined plate settler is fed to the next inclined plate settler in the series and the overflow of each inclined plate settler is fed to the previous inclined plate separator in the series, the underflow of the last inclined plate settler being the second product and the overflow from the first inclined plate settler being the first product.

19. The process line as claimed in claim 18, further comprising:

(c) a tailings deposition pond for receiving the second product, whereby, when the coarse solids settle out from the water, the water from the tailings disposition pond is recycled back to the last inclined plate settler.

20. The process line as claimed in claim 18, further comprising a bitumen froth cleaning plant operative to receive the first product and remove a portion of the fines and excess water therefrom to produce cleaned bitumen froth.

21. The process line as claimed in claim 20, wherein the bitumen froth cleaning plant comprises an inclined plate settler and a flotation cell in series, each producing an overflow and an underflow and operatively interconnected so that the flotation cell receives the underflow from the inclined plate settler and the overflow from the flotation cell is recycled back to the inclined plate settler, the overflow from the inclined plate settler being the cleaned bitumen froth.

22. A process line as claimed in claim 20, wherein the fines and water are further processed in a fine tails thickener to produce a fine tails paste for disposal and warm water for reuse in oil sand slurry preparation.

* * * * *